US 9,256,332 B2

(12) United States Patent
Lo et al.

(10) Patent No.: US 9,256,332 B2
(45) Date of Patent: Feb. 9, 2016

(54) CONCURRENT DRIVING CAPACITIVE TOUCH SENSING DEVICE CAPABLE OF RESENDING DRIVE SIGNALS

(71) Applicant: PIXART IMAGING INC., Hsin-Chu County (TW)

(72) Inventors: Chung-Wen Lo, Santa Clara, CA (US); Ken Crandall, Santa Clara, CA (US); Hsin-Chia Chen, Santa Clara, CA (US); Raman Sahgal, Santa Clara, CA (US)

(73) Assignee: Pixart Imaging Inc., Hsin-Chu County (TW)

( * ) Notice: Subject to any disclaimer, the term of this patent is extended or adjusted under 35 U.S.C. 154(b) by 0 days.

(21) Appl. No.: 14/219,168

(22) Filed: Mar. 19, 2014

(65) Prior Publication Data

US 2015/0268758 A1  Sep. 24, 2015

(51) Int. Cl.
*G06F 3/041* (2006.01)
*G06F 3/044* (2006.01)

(52) U.S. Cl.
CPC .............. *G06F 3/044* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 6,452,514 B1 | 9/2002 | Philipp | |
| 2010/0096193 A1 | 4/2010 | Yilmaz et al. | |
| 2015/0054754 A1* | 2/2015 | Han | 345/173 |
| 2015/0097807 A1* | 4/2015 | Lee | 345/174 |

* cited by examiner

*Primary Examiner* — Joseph Haley
(74) *Attorney, Agent, or Firm* — Rosenberg, Klein & Lee

(57) ABSTRACT

There is provided a concurrent driving capacitive touch sensing device including a drive end, a capacitive sensing matrix and a detection end. The capacitive sensing matrix includes a plurality of drive electrodes and sense electrodes crossing to each other. The drive end is configured to concurrently input cycle data of encoded and modulated drive signals into the drive electrodes. The detection end is coupled to one of the sense electrodes and configured to acquire a predetermined number of sampled values corresponding to the cycle data associated with the coupled sense electrode and generate a response signal to the drive end according to the sampled values, wherein the drive end resends the cycle data according to the response signal.

18 Claims, 6 Drawing Sheets

| drive signal of each channel | K₁ | K₂ | ... | Kₙ |
|---|---|---|---|---|
| $X_1(t_k)$ | $X(t)a_{11}x_1=D_{11}$ | $X(t)a_{21}x_1=D_{21}$ | | $X(t)a_{n1}x_1=D_{n1}$ |
| $X_2(t_k)$ | $X(t)a_{12}x_2=D_{12}$ | $X(t)a_{22}x_2=D_{22}$ | ... | $X(t)a_{n2}x_2=D_{n2}$ |
| ⋮ | ⋮ | ⋮ | | ⋮ |
| $X_n(t_k)$ | $X(t)a_{1n}x_n=D_{1n}$ | $X(t)a_{2n}x_n=D_{2n}$ | | $X(t)a_{nn}x_n=D_{nn}$ |

CONCURRENT DRIVING CAPACITIVE TOUCH SENSING DEVICE CAPABLE OF RESENDING DRIVE SIGNALS

BACKGROUND

1. Field of the Disclosure

This disclosure generally relates to a sensing device and, more particularly, to a concurrent driving capacitive touch sensing device capable of resending drive signals.

2. Description of the Related Art

Capacitive sensors generally include a pair of electrodes configured to sense a finger. When a finger is present, the amount of charge transfer between the pair of electrodes can be changed so that it is able to detect whether a finger is present or not according to a voltage variation. It is able to form a sensing matrix by arranging a plurality of electrode pairs in matrix.

FIGS. 1A and 1B show schematic diagrams of the conventional capacitive sensor which includes a first electrode 91, a second electrode 92, a drive circuit 93 and a detection circuit 94. The drive circuit 93 is configured to input a drive signal to the first electrode 91. Electric field can be produced between the first electrode 91 and the second electrode 92 so as to transfer charges to the second electrode 92. The detection circuit 94 is configured to detect the amount of charge transfer to the second electrode 92.

When a finger is present, e.g. shown by an equivalent circuit 8, the finger may disturb the electric field between the first electrode 91 and the second electrode 92 so that the amount of charge transfer is reduced. The detection circuit 94 can detect a voltage variation to accordingly identify the presence of the finger.

Principles of the conventional active capacitive sensor may be referred to U.S. Patent Publication No. 2010/0096193 and U.S. Pat. No. 6,452,514.

Referring to FIG. 1C, the detection circuit 94 generally includes a detection switch 941 and a detection unit 942, wherein the detection unit 942 can detect a voltage value on the second electrode 92 only within the on-period of the detection switch 941. However, signal lines of the sensing matrix in different touch panels can have different capacitances, and the drive signal inputted by the drive circuit 93 can have different phase shifts corresponding to different sensing matrices. Therefore, the on-state of the detection switch 941 has to be adjusted corresponding to different touch panels or it is not able to detect correct voltage values. And this adjustment process can increase the manufacturing complexity.

In addition, when the capacitive sensor is applied to some systems (e.g. the liquid crystal display system), serious noise problems may exist. Accordingly, how to suppress the noise is also an important issue of this field.

SUMMARY

Accordingly, the present disclosure provides a concurrent driving capacitive touch sensing device capable of overcoming the influence of the phase shift and the noise.

The present disclosure provides a concurrent driving capacitive touch sensing device that may detect every channel several times within a transmission frame so as to increase the signal-to-noise ratio.

The present disclosure further provides a concurrent driving capacitive touch sensing device that may resend drive signals when the noise interference is obvious and ignore the detection result outside a predetermined detection range thereby increasing the identification accuracy.

The present disclosure provides a concurrent driving capacitive touch sensing device including a capacitive sensing matrix, a drive end and a detection end. The capacitive sensing matrix includes a plurality of drive electrodes and a plurality of sense electrodes configured to form coupling capacitance. The drive end is configured to concurrently input cycle data of encoded and modulated drive signals into the drive electrodes. The detection end is coupled to one of the sense electrodes and configured to acquire a predetermined number of sampled values corresponding to the cycle data associated with the coupled sense electrode and generate a response signal to the drive end according to the sampled values, wherein the drive end resends the cycle data according to the response signal.

The present disclosure further provides a concurrent driving capacitive touch sensing device including a capacitive sensing matrix, a drive end and a detection end. The capacitive sensing matrix includes a plurality of drive electrodes and a plurality of sense electrodes configured to form coupling capacitance. The drive end is configured to concurrently input a plurality of cycle data of encoded and modulated drive signals into the drive electrodes in each of a plurality of drive time slots of a frame of the capacitive sensing matrix. The detection end is coupled to one of the sense electrodes and configured to acquire a predetermined number of sampled values corresponding to each of the cycle data of the drive time slots associated with the coupled sense electrode and generate a response signal to the drive end according to the sampled values, wherein the drive end extends the associated drive time slot according to the response signal.

The present disclosure further provides a concurrent driving capacitive touch sensing device including a capacitive sensing matrix, a drive end and a detection end. The capacitive sensing matrix includes a plurality of drive electrodes and a plurality of sense electrodes configured to form coupling capacitance. The drive end is configured to concurrently input a plurality of cycle data of encoded and modulated drive signals into the drive electrodes in each of a plurality of drive time slots of a frame of the capacitive sensing matrix, wherein an cycle number of the cycle data of at least a part of the drive time slots is larger than a predetermined cycle number. The detection end is configured to be sequentially coupled to the sense electrodes of the capacitive sensing matrix and decode a detection matrix obtained by detecting channels of the drive electrodes and the sense electrodes so as to generate a two-dimensional detection vector corresponding to each of the channels.

In one aspect, it is able to use a Hadamard matrix to perform the encoding process and use an inverse Hadamard matrix of the Hadamard matrix to perform the decoding process.

In one aspect, it is able to only use the phase modulation to perform the signal modulation, or it is able to use both the phase modulation and the amplitude modulation to perform the signal modulation.

In one aspect, the norm of vector may be calculated by a coordinate rotation digital computer (CORDIC).

In one aspect, the drive signal may be a time-varying signal, such as a periodic signal.

In one aspect, when a magnitude variation of sampled values corresponding to a cycle data is not within a predetermined detection range, the detection end generates the response signal to the drive end. The drive end may resend the cycle data or extend the drive time slot associated with the cycle data inducing invalid sampled values when receiving the response signal.

In one aspect, when a magnitude variation of sampled values corresponding to a cycle data is within a predetermined detection range, the detection end generates the response signal to the drive end. The drive end may resend the cycle data or extend the drive time slot associated with the cycle data inducing invalid sampled values when not receiving the response signal for a predetermined time interval.

In the concurrent driving capacitive touch sensing device according to the embodiment of the present disclosure, when an object is present close to a sensing element, the norm of vector may become larger or become smaller. Therefore, by comparing the norm of vector with a threshold, it is able to identify whether the object is present close to the sensing element. Because the norm of vector is a scalar, it is able to eliminate the interference caused by the phase shift of signal lines in the sensing matrix thereby improving the detection accuracy.

In the concurrent driving capacitive touch sensing device according to the embodiment of the present disclosure, when identifying that the noise influence is obvious, the detection end may inform the drive end to resend the encoded and modulated drive signals by means of a response signal. The detection end may calculate detection signals only using the sampled values within a predetermined detection range (i.e. valid sampled values) and ignore the sampled values outside the predetermined detection range (i.e. invalid sampled values) thereby effectively improving the identification accuracy.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1A:
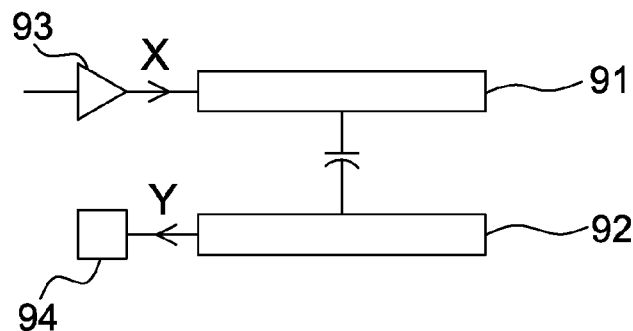
FIGS. 1A-1C show schematic diagrams of the conventional active capacitive sensor.
Figure 1B:
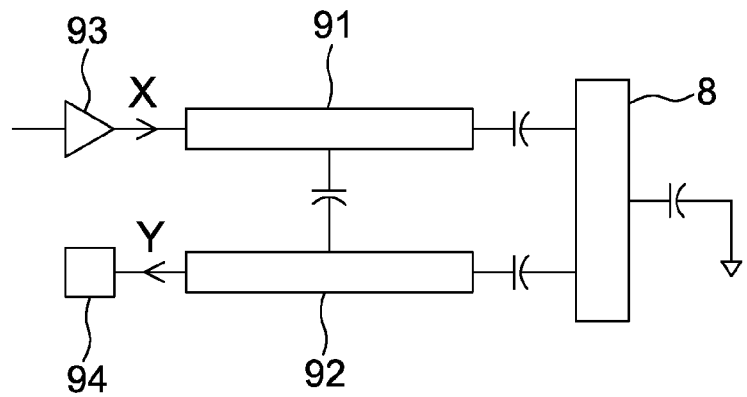
Figure 1C:
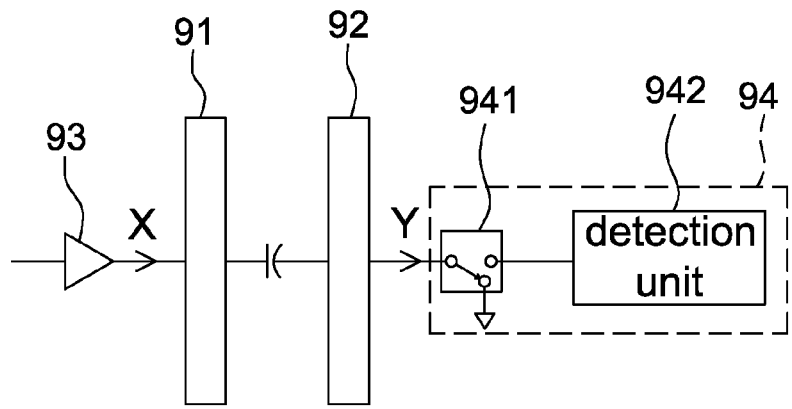
Figure 2:
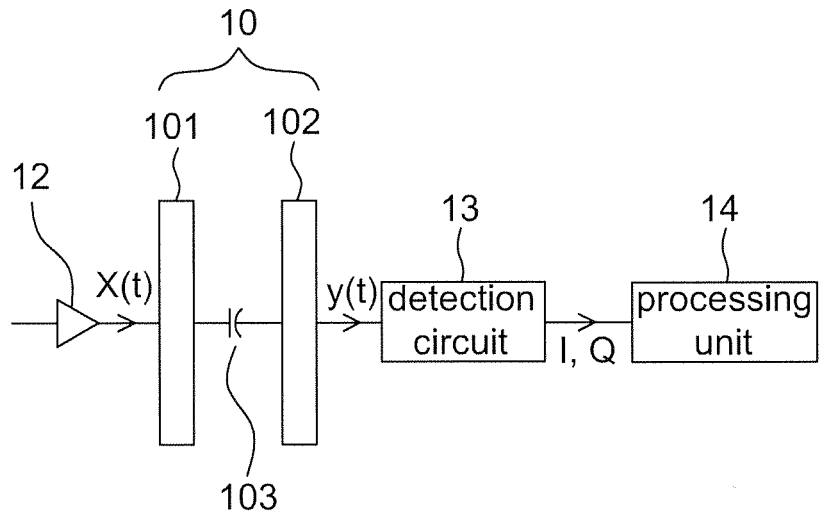
FIG. 2 shows a schematic diagram of the capacitive touch sensing device according to an embodiment of the present disclosure.

Referring to FIG. 2, it shows a schematic diagram of the capacitive touch sensing device according to an embodiment of the present disclosure. The capacitive touch sensing device of this embodiment includes a sensing element 10, a drive unit 12, a detection circuit 13 and a processing unit 14. The capacitive touch sensing device is configured to detect whether an object (e.g. a finger or a metal plate, but mot limited to) approaches the sensing element 10 according to the change of the amount of charges on the sensing element 10.

The sensing element 10 includes a first electrode 101 (e.g. a drive electrode) and a second electrode 102 (e.g. a sense electrode), and electric field can be produced to form a coupling capacitance 103 between the first electrode 101 and the second electrode 102 when a voltage signal is inputted to the first electrode 101. The first electrode 101 and the second electrode 102 may be arranged properly without any limitation as long as the coupling capacitance 103 can be formed (e.g. via a dielectric layer), wherein principles of forming the electric field and the coupling capacitance 103 between the first electrode 101 and the second electrode 102 is well know and thus are not described herein.

The drive unit 12 may be a signal generator and configured to input a drive signal x(t) to the first electrode 101 of the sensing element 10. The drive signal x(t) may be a time-varying signal, such as a periodic signal. In other embodiments, the drive signal x(t) may be a pulse signal, such as a square wave or a triangle wave, but not limited thereto. The drive signal x(t) may couple a detection signal y(t) on the second electrode 102 through the coupling capacitance 103.

The detection circuit 13 is coupled to the second electrode 102 of the sensing element 10 and configured to detect the detection signal y(t) and to modulate the detection signal y(t) respectively with two signals so as to generate a pair of modulated detection signals, which are served as two components I and Q of a two-dimensional detection vector. The two signals may be continuous signals or vectors that are orthogonal or non-orthogonal to each other. In one aspect, the two signals include a sine signal and a cosine signal, wherein a phase difference between the sign signal and the cosine signal may or may not be 0.

The processing unit 14 is configured to calculate a scale of the pair of the modulated detection signals, which is served as a norm of vector of the two-dimensional detection vector (I,Q), and to compare the norm of vector with a threshold TH so as to identify a touch event. In one aspect, the processing unit 14 may calculate the norm of vector $R=\sqrt{I^2+Q^2}$ by using software. In other aspect, the processing unit 14 may calculate by hardware or firmware, such as using the CORDIC (coordinate rotation digital computer) shown in FIG. 4 to calculate the norm of vector $R=\sqrt{i^2+q^2}$, wherein the CORDIC is a well known fast algorithm. For example, when there is no object closing to the sensing element 10, the norm of vector calculated by the processing unit 14 is assumed to be R; and when an object is present nearby the sensing element 10, the norm of vector is decreased to R'. When the norm of vector R' is smaller than the threshold TH, the processing unit 14 may identify that the object is present close to the sensing element 10 and induces a touch event. It should be mentioned that when another object, such as a metal plate, approaches the sensing element 10, the norm of vector R may be increased. Therefore, the processing unit 14 may identify a touch event occurring when the norm of vector becomes larger than a predetermined threshold.

In another embodiment, the processing unit 14 may perform coding on the two components I and Q of the two-dimensional detection vector by using quadrature amplitude-shift keying (QASK), such as 16-QASK. A part of the codes may be corresponded to the touch event and the other part of the codes may be corresponded to non-touch state and these codes are previously saved in the processing unit 14. When the processing unit 14 calculates the QASK code of two current components I and Q according to the pair of the modulated detection signals, it is able to identify that whether an object is present near the sensing element 10.

Figure 3A:
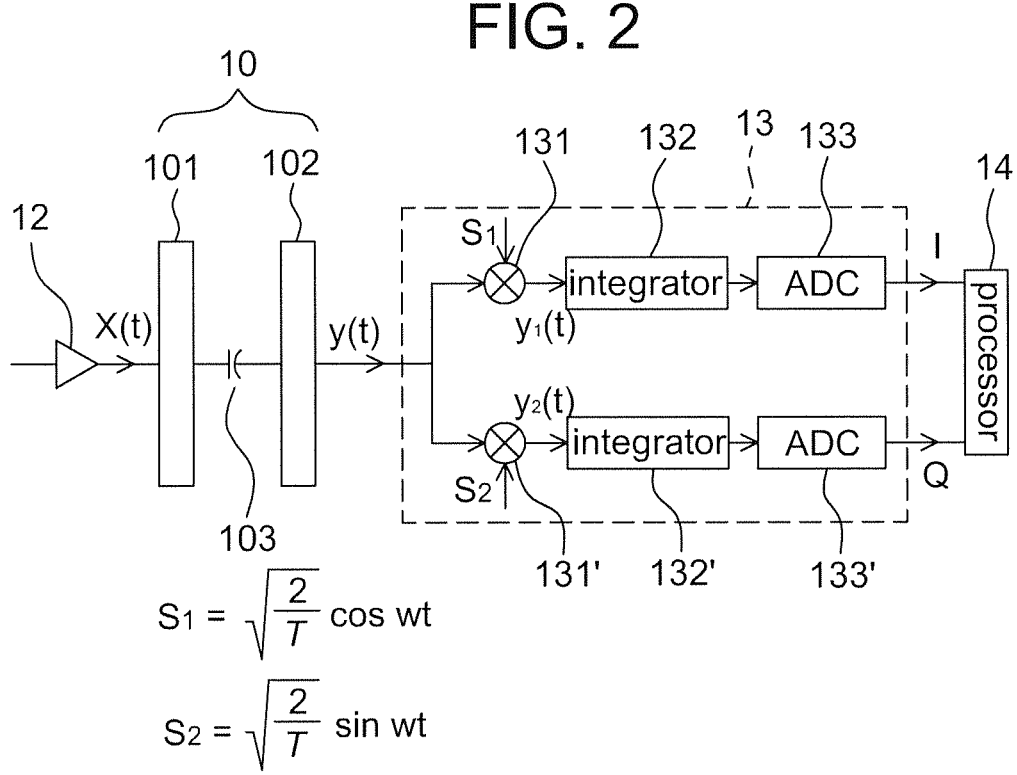
FIGS. 3A-3B show other schematic diagrams of the capacitive touch sensing device according to an embodiment of the present disclosure.
Figure 3B:
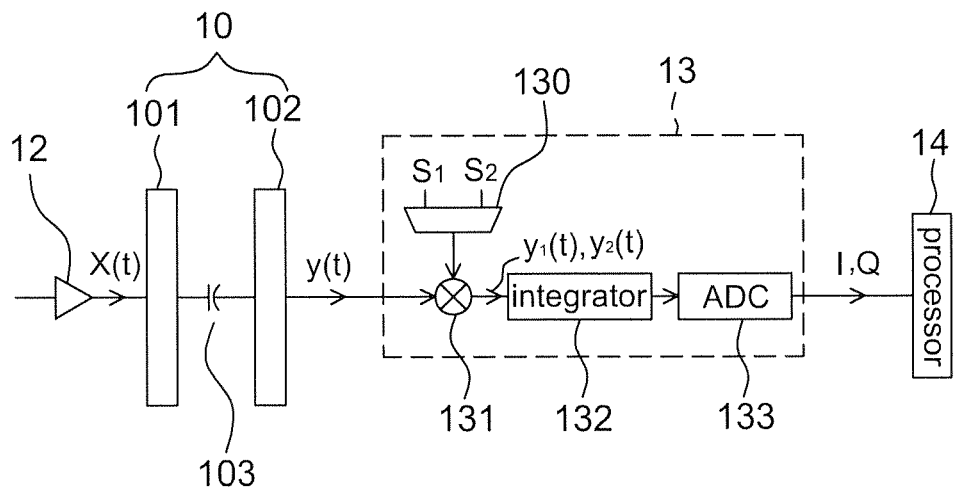

FIGS. 3A and 3B respectively show another schematic diagram of the capacitive touch sensing device according to an embodiment of the present disclosure in which embodiments of the detection circuit 13 are shown.

In FIG. 3A, the detection circuit 13 includes two multipliers 131 and 131', two integrators 132 and 132', two analog-to-digital converters (ADC) 133 and 133' configured to process the detection signal y(t) so as to generate a two-dimensional detection vector (I,Q). The two multipliers 131 and 131' are indicated to module two signals, such as $S_1=\sqrt{2/T} \cos(\omega t)$ and $S_2=\sqrt{2/T} \sin(\omega t)$ herein, with the detection signal y(t) so as to generate a pair of modulated detection signals $y_1(t)$ and $y_2(t)$. In order to sample the pair of the modulated detection signals $y_1(t)$ and $y_2(t)$, two integrators 132 and 132' are configured to integrate the pair of the modulated detection signals $y_1(t)$ and $y_2(t)$. In this embodiment, the two integrators 132 and 132' may be any proper integration circuit, such as the capacitor. The two ADC 133 and 133' are configured to digitize the pair of the modulated detection signals $y_1(t)$ and $y_2(t)$ being integrated so as to generate two digital components I and Q of the two-dimensional detection vector. It is appreciated that the two ADC 133 and 133' start to acquire digital data when voltages on the two integrators 132 and 132' are stable. In addition to the two continuous signals mentioned above may be used as the two signals, the two signals may also be two vectors, for example $S_1=[1\ 0\ -1\ 0]$ and $S_2=[0\ -1\ 0\ 1]$ so as to simplify the circuit structure. The two signals may be proper simplified vectors without any limitation as long as the used vectors may simplify the processes of modulation and demodulation.

In FIG. 3B, the detection circuit 13 includes a multiplier 131, an integrator 132 and an analog-to-digital converter 133, and the two signals $S_1$ and $S_2$ are inputted to the multiplier 131 via a multiplexer 130 to be modulated with the detection signal y(t) so as to generate two modulated detection signals $y_1(t)$ and $y_2(t)$. In addition, functions of the multiplier 131, the integrator 132 and the ADC 133 are similar to those shown in FIG. 3A and thus details thereof are not described herein.

As mentioned above, the detection method of the capacitive touch sensing device of the present disclosure includes the steps of: inputting a drive signal to a first electrode of a sensing element; modulating a detection signal coupled to a second electrode from the drive signal through a coupling capacitance respectively with two signals so as to generate a pair of modulated detection signals; and calculating a scale of the pair of the modulated detection signals to accordingly identify a touch event.

Referring to FIGS. 3A and 3B for example, the drive unit 12 inputs a drive signal x(t) to the first electrode 101 of the sensing element 10, and the drive signal x(t) may couple a detection signal y(t) on the second electrode 102 of the sensing element 10 through the coupling capacitance 103. Next, the detection circuit 13 respectively modulates the detection signal y(t) with two signals $S_1$ and $S_2$ to generate a pair of modulated detection signals $y_1(t)$ and $y_2(t)$. The processing unit 14 calculates a scale of the pair of the modulated detection signals $y_1(t)$ and $y_2(t)$ to accordingly identify a touch event, wherein the method of calculating the scale of the pair of the modulated detection signals $y_1(t)$ and $y_2(t)$ may be referred to FIG. 4 and its corresponding descriptions. In addition, before calculating the scale of the pair of the modulated detection signals $y_1(t)$ and $y_2(t)$, the integrator 132 and/or 132' may be used to integrate the pair of the modulated detection signals $y_1(t)$ and $y_2(t)$ and then the ADC 133 and/or 133' may be used perform the digitization so as to output the two digital components I and Q of the two-dimensional detection vector (I,Q).

Figure 5:
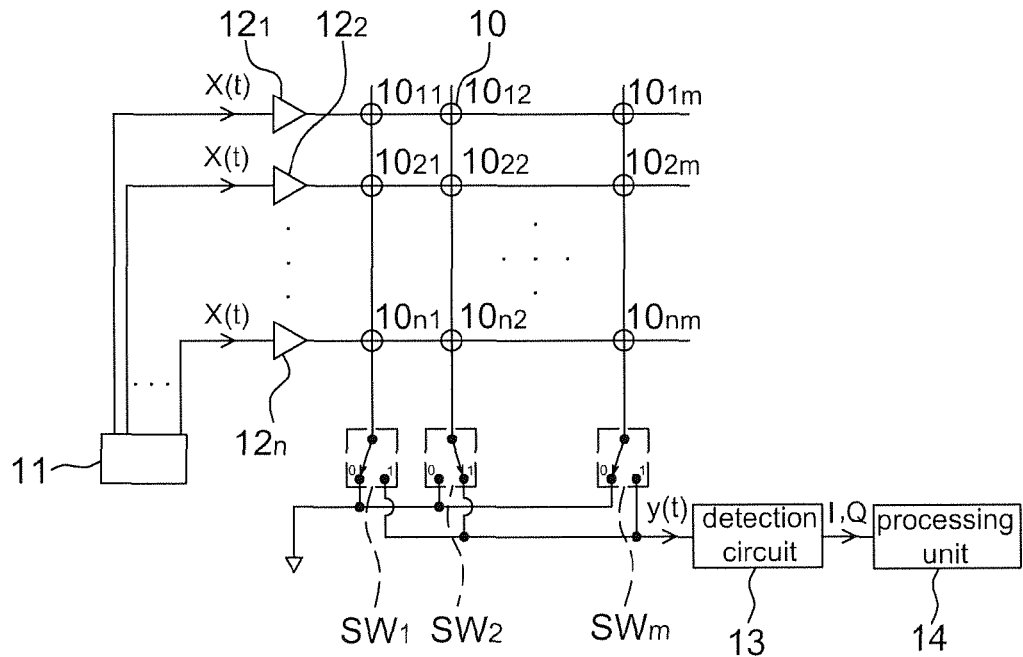
FIG. 5 shows a schematic diagram of the capacitive touch sensing device according to another embodiment of the present disclosure.

Referring to FIG. 5, it shows a schematic diagram according to another embodiment of the present disclosure. A plurality of sensing elements 10 arranged in matrix may form a capacitive sensing matrix in which every row of the sensing elements 10 is driven by one of the drive units $12_1$-$12_n$ and the detection circuit 13 detects output signals of every column of the sensing elements 10 through one of the switch devices $SW_1$-$SW_m$. As shown in FIG. 5, the drive unit $12_1$ is configured to drive the first row of sensing elements $10_{11}$-$10_{1m}$; the drive unit $12_2$ is configured to drive the second row of sensing elements $10_{21}$-$10_{2m}$; . . . ; and the drive unit $12_n$ is configured to drive the nth row of sensing elements $10_{n1}$-$10_{nm}$; wherein, n and in are positive integers and the value thereof may be determined according to the size and resolution of the capacitive sensing matrix without any limitation.

In this embodiment, each of the sensing elements 10 (shown by circles herein) include a first electrode and a second electrode configured to form a coupling capacitance therebetween as shown in FIGS. 2, 3A and 3B. The drive units $12_1$-$12_n$ are respectively coupled to the first electrode of a row of the sensing elements 10. A timing controller 11 is configured to control the drive units $12_1$-$12_n$ to sequentially output a drive signal x(t) to the first electrode of the sensing elements 10.

The detection circuit 13 is coupled to the second electrode of a column of the sensing elements 10 through a plurality of switch devices $SW_1$-$SW_m$ to sequentially detect a detection signal y(t) coupled to the second electrode from the drive signal x(t) through the coupling capacitance of the sensing elements 10. The detection circuit 13 utilizes two signals to respectively modulate the detection signal y(t) to generate a pair of modulated detection signals, wherein details of generating the pair of the modulated detection signals has been described in FIGS. 3A and 3B and their corresponding descriptions and thus are not repeated herein.

Figure 4:
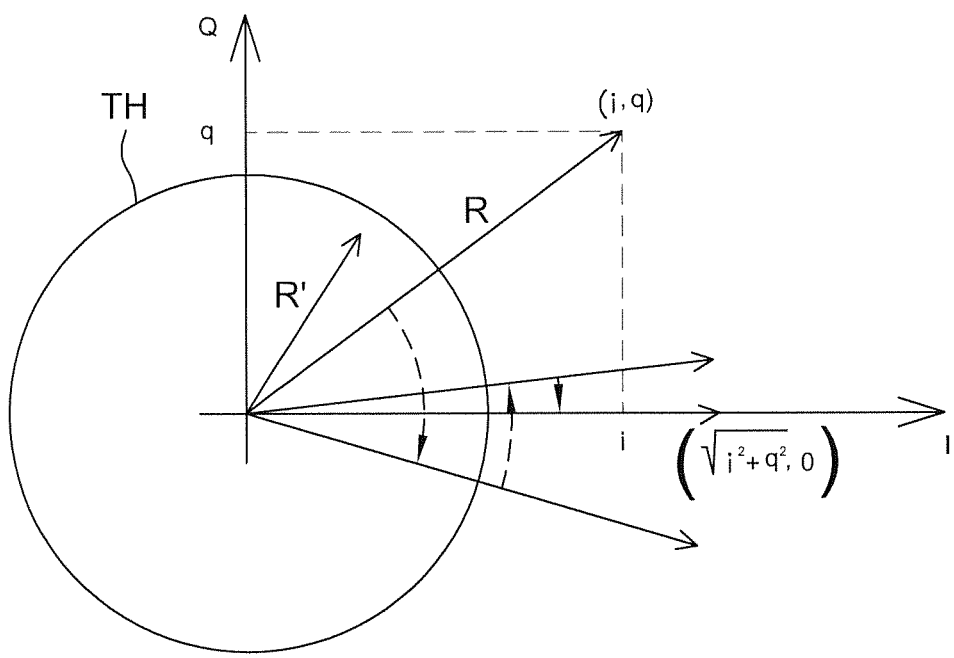
FIG. 4 shows a schematic diagram of the norm of vector and the threshold used in the capacitive touch sensing device according to the embodiment of the present disclosure.

The processing unit 14 identifies a touch event and a touch position according to the pair of the modulated detection signals. As mentioned above, the processing unit 14 may calculate a norm of vector of a two-dimensional detection vector of the pair of the modulated detection signals and identifies the touch event when the norm of vector is larger than or equal to, or smaller than or equal to a threshold TH as shown in FIG. 4.

In this embodiment, when the timing controller 11 controls the drive unit $12_1$ to output the drive signal x(t) to the first row of the sensing elements $10_{11}$-$10_{1m}$, the switch devices $SW_1$-$SW_m$ are sequentially turned on such that the detection circuit 13 may detect the detection signal y(t) sequentially outputted by each sensing element of the first row of the sensing elements $10_{11}$-$10_{1m}$. Next, the timing controller 11 sequentially controls other drive units $12_2$-$12_n$ to output the drive signal x(t) to every row of the sensing elements. When the detection circuit 13 detects all of the sensing elements once, a scan period is accomplished. The processing unit 14 identifies the position of the sensing elements that the touch event occurs as the touch position. It is appreciated that said touch position may be occurred on more than one sensing elements 10 and the processing unit 14 may take all positions of a plurality of sensing elements 10 as touch positions or take one of the positions (e.g. the center or gravity center) of a plurality of adjacent sensing elements 10 as the touch position.

Figure 6:
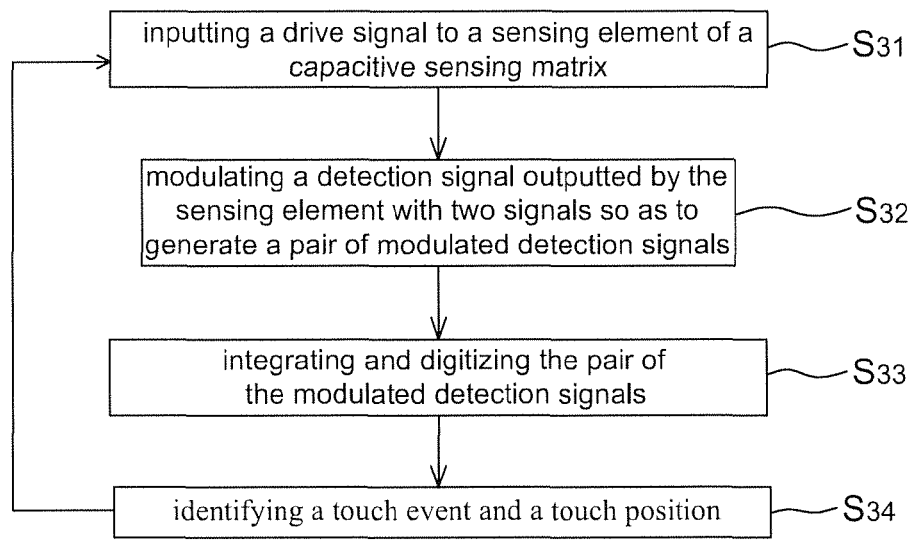
FIG. 6 shows a flow chart of the operation of the capacitive touch sensing device shown in FIG. 5.

Referring to FIG. 6, it shows a flow chart of the operation of the capacitive sensing device shown in FIG. 5, which includes the steps of: inputting a drive signal to a sensing element of a capacitive sensing matrix (Step $S_{31}$); respectively modulating a detection signal outputted by the sensing element with two signals so as to generate a pair of modulated detection signals (Step $S_{32}$); integrating and digitizing the pair of the modulated detection signals (Step $S_{33}$); and identifying a touch event and a touch position (Step $S_{34}$). Details of the operation of this embodiment have been described in FIG. 5 and its corresponding descriptions and thus are not repeated herein.

In another aspect, in order to save the power consumption of the capacitive touch sensing device shown in FIG. 5, the timing controller 11 may control more than one drive units $12_1$-$12_n$ to simultaneously output the drive signal x(t) to the associated row of the sensing elements. The detection circuit 13 respectively modulates the detection signal y(t) of each row with different two continuous signals $S_1$ and $S_2$ for distinguishing. In addition, the method of identifying the touch event and the touch position are similar to FIG. 5 and thus details thereof are not repeated herein.

In the embodiment of the present disclosure, the detection circuit 13 may further include the filter and/or the amplifier to improve the signal quality. In addition, the processing unit 14 may be integrated with the detection circuit 13.

As mentioned above, the phase shift during signal transmission caused by the capacitance on signal lines may be ignored by calculating the norm of vector of a two-dimensional detection vector. In other words, if a phase shift exists between drive signals x(t) of every channel, the phase shift may also be ignored by calculating the norm of vector. Therefore in an alternative embodiment of the present disclosure, it is able to concurrently drive different channels in the same drive time slot with a plurality of drive signals having phase shift from each other, and to identify a touch event and/or a touch position by calculating a norm of vector of the two-dimensional detection vector of every channel in the receiving end. In addition, as the phase modulation of different channels is implemented on the drive signal x(t), in the receiving end it is no longer necessary to use two signals to modulate the detection signal y(t) respectively. Details of this embodiment are described hereinafter.

Figure 7:
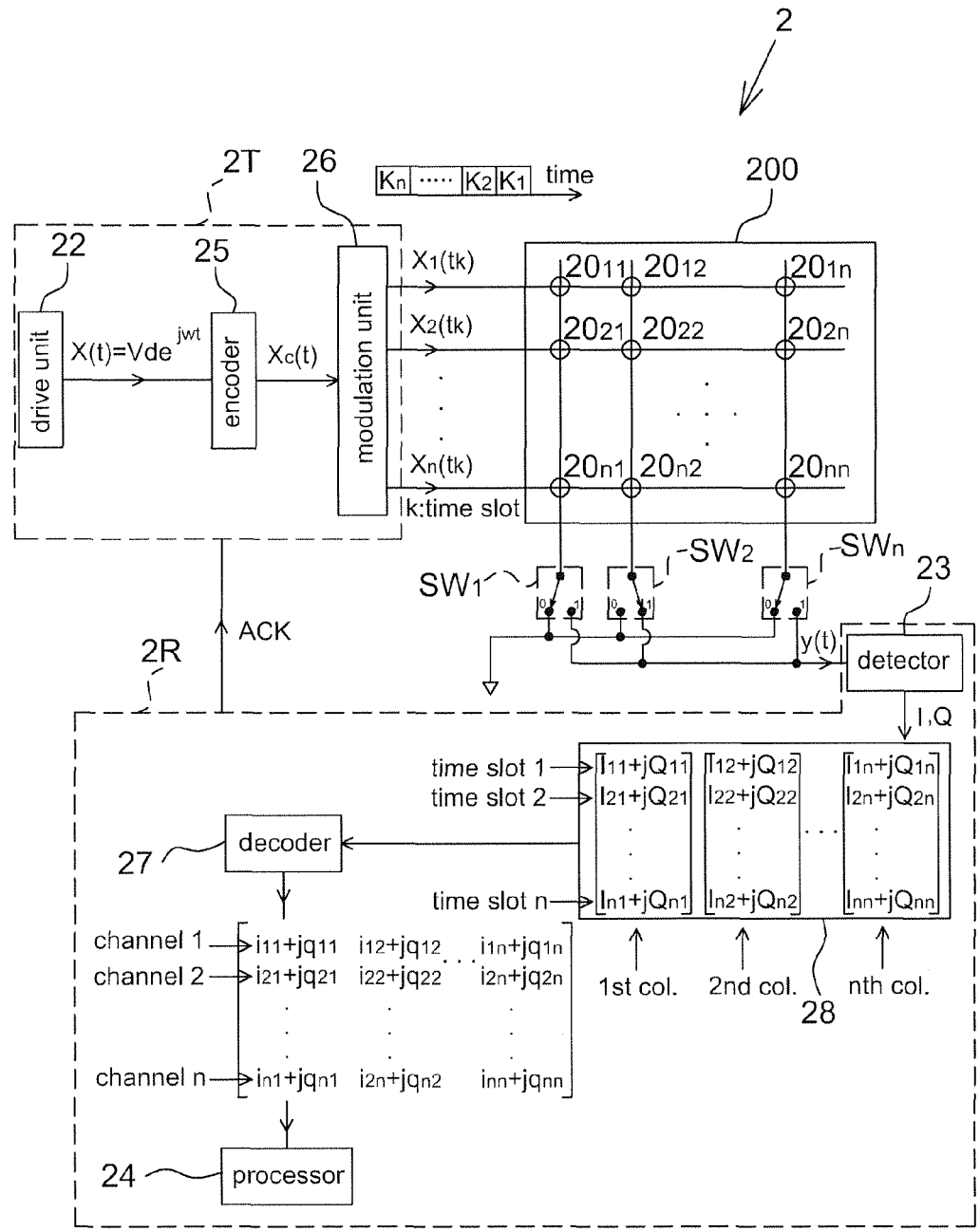
FIG. 7 shows a schematic diagram of the concurrent driving capacitive touch sensing device according to an embodiment of the present disclosure.

Referring to FIG. 7, it shows a schematic diagram of the concurrent driving capacitive touch sensing device 2 according to an embodiment of the present disclosure. The concurrent driving capacitive touch sensing device 2 includes a drive end 2T, a capacitive sensing matrix 200 and a detection end 2R, wherein the capacitive sensing matrix 200 has a plurality of channels. For example, the capacitive sensing matrix 200 includes a plurality of drive electrodes (e.g. arranged transversely in FIG. 7) and a plurality of sense electrodes (e.g. arranged longitudinally in FIG. 7) crossing to each other so as to form a plurality of sensing elements (e.g. $20_{11}$~$20_{mn}$) arranged in rows and columns. Said channel herein is referred to a signal path between the drive end 2T, the detection end 2R and a sensing element, wherein the sensing element is driven by the drive end 2T and detected by the detection end 2R.

It should be mentioned that the drive electrodes and the sense electrodes are not necessary to be arranged to cross to each other as long as the coupling capacitance can be formed therebetween. For example, in a single layer capacitive touch sensing device, the drive electrodes and the sense electrodes may be formed on the same plane without crossing to each other.

Figures 8, 9:
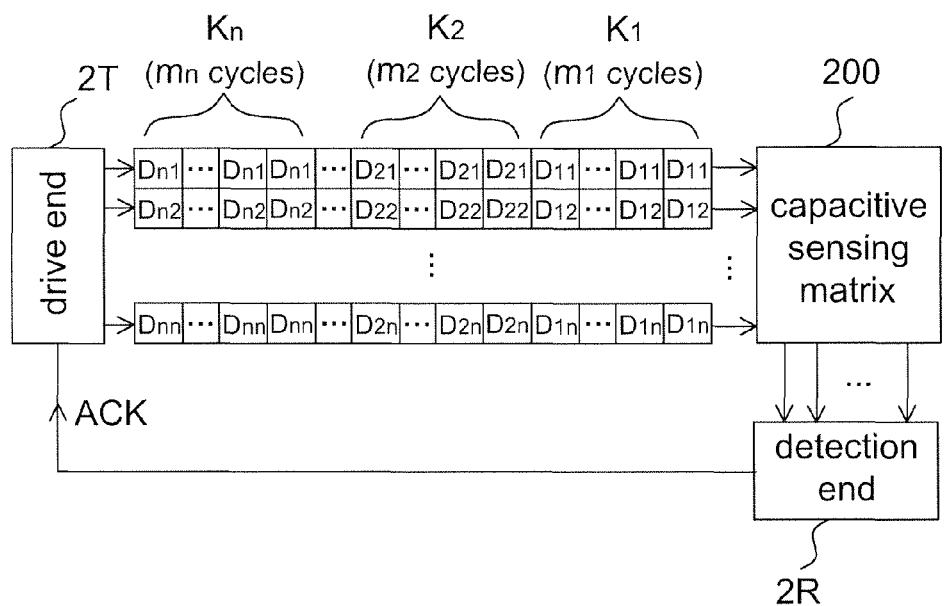
FIG. 8 shows a schematic diagram of drive signals of every channel in every drive time slot of the concurrent driving capacitive touch sensing device according to the embodiment of the present disclosure.
FIG. 9 shows an operational schematic diagram of the concurrent driving capacitive touch sensing device according to the embodiment of the present disclosure.

The drive end 2T is configured to concurrently input cycle data of encoded and modulated drive signals into the drive electrodes of the capacitive sensing matrix 200, e.g. concurrently inputting a plurality of cycle data of encoded and modulated drive signals into the drive electrodes in each drive time slot of a plurality of drive time slots $K_1$ to $K_n$ of a scan period (or a frame) of the capacitive sensing matrix 200, wherein the plurality of cycle data in the same drive time slot and corresponding to the same drive electrode are all identical (as shown in FIG. 9).

The detection end 2R is coupled to one of the sense electrodes and configured to acquire a predetermined number of sampled values corresponding to the cycle data associated with the coupled sense electrode and generate a response signal ACK to the drive end 2T according to the predetermined number of sampled values, wherein the predetermined number may be determined according to the data processing algorithm or the required accuracy without particular limitation, e.g. the predetermined number may be 4 or 8. In this embodiment, in order to eliminate the noise influence and improve the identification accuracy, the drive end 2T may resend the cycle data according to the response signal ACK.

For example in one embodiment, when a magnitude variation of the predetermined number of sampled values is not within a predetermined detection range, it means that the noise is high enough to influence the identification and thus the detection end 2R generates the response signal ACK to the drive end 2T. The drive end 2T resends the cycle data when receiving the response signal ACK. In another embodiment, when a magnitude variation of the predetermined number of sampled values is within a predetermined detection range, it means that the noise is still within an endurable range and thus the detection end 2R generates the response signal ACK to the drive end 2T indicating that the cycle data needs not be resent. The drive end 2T only resends the cycle data when not receiving the response signal ACK for a predetermined time interval. The predetermined detection range may be previously determined according to the endurable noise of the system and the system type to be applied. The magnitude variation may be the processing result of the notch filtering or standard deviation of the sampled values.

For example, the detection end 2R may be coupled to one of the sense electrodes (e.g. a first sense electrode) and configured to acquire a predetermined number of sampled values corresponding to each of the cycle data of the drive time slots $K_1$ to $K_n$ associated with the coupled sense electrode in a frame; for example, when a slot number of drive time slots is n, a cycle number of cycle data is m and a sample number of sampled values associated with each cycle data is s, the detection end 2R may acquire n×m×s sampled values corresponding to the coupled sense electrode within one frame. The detection end 2R is also configured to generate a response signal ACK to the drive end 2T according to the predetermined number of sampled values (e.g. s sampled values) corresponding to each of the cycle data. In other words, in one drive time slot the drive end 2T inputs a predetermined number of identical cycle data into every drive electrode, e.g. $m_1$ cycles of cycle data $D_{11}$ inputted into the first drive electrode in FIG. 9. Similarly, in order to eliminate the noise interference and improve the identification accuracy, the drive end 2T may extend the corresponded drive time slot according to the response signal ACK so as to increase the cycle number (i.e. increasing the cycle number to be larger than the predetermined cycle number).

For example in one embodiment, when a magnitude variation of the predetermined number of sampled values corresponding to a cycle data is not within a predetermined detection range, it means that the noise is high enough to influence the identification and thus the detection end 2R generates the response signal ACK to the drive end 2T. The drive end 2T extends the drive time slot associated with the cycle data inducing invalid sampled values so as to increase the cycle number of the cycle data within the drive time slot when receiving the response signal ACK. In another embodiment, when a magnitude variation of the predetermined number of sampled values corresponding to a cycle data is within a predetermined detection range, it means that the noise is still within an endurable range and thus the detection end 2R generates the response signal ACK to the drive end 2T indicating that the cycle data needs not be resent. The drive end 2T extends the drive time slot associated with the cycle data inducing invalid sampled values so as to increase the cycle number of the cycle data within the drive time slot only when not receiving the response signal ACK for a predetermined time interval. In one extended drive time slot, if the sampled values corresponding to a cycle data is not within the predetermined detection range, the sampled values are referred to invalid sampled values and may be ignored; and in the extended drive time slot, if the sampled values corresponding to a cycle data is within the predetermined detection range, the sampled values are referred to valid sampled values.

It should be mentioned that the drive end 2T may concurrently drive only a part of the drive electrodes rather than all drive electrodes, and a slot number of the drive time slots (e.g. n) may be equal to an electrode number of the drive electrodes concurrently driven by the drive end 2T. In addition, in this embodiment the detection end 2R may identify the sampled values of only one of the sense electrodes (e.g. the first sense electrode) of the capacitive sensing matrix 200 or identify the sampled values of several sense electrodes of the capacitive sensing matrix 200 so as to determine whether to allow the drive end 2T to resend the encoded and modulated drive signals.

The detection end 2R may be sequentially coupled to the sense electrodes of the capacitive sensing matrix 200 and configured to decode a detection matrix, which is obtained by detecting channels formed by the drive electrodes and the sense electrodes, so as to generate a two-dimensional detection vector corresponding to each of the channels and calculate a norm of vector of the two-dimensional detection vector, wherein each matrix element of the detection matrix is a detection signal obtained according to valid sampled values in each of the drive time slots and the detection matrix is a one-dimensional matrix. In addition, the detection end 2R may further compare the norm of vector with a threshold so as to identify a touch event and/or a touch position (as shown in FIG. 4). In one embodiment, a slot number of the drive time slots may be equal to an electrode number of the drive electrodes.

In the present disclosure, as the drive end 2T may resend the cycle data in a part of the drive time slots, a cycle number of the cycle data in at least a part of the drive time slots may be larger than a predetermined cycle number, e.g. 32 cycles, but not limited to. In other words, when the detection end 2R identifies that the noise interference is endurable, a drive time slot includes the predetermined cycle number of cycle data; whereas when a drive time slot includes a set of sampled values corresponding to a cycle data not within a predetermined detection range, the cycle number of cycle data included in the drive time slot is larger than the predetermined cycle number. For example, at least one of the cycle numbers $m_1$ to $m_n$ in FIG. 9 is larger than 32 and the rest cycle numbers are equal to 32.

In this embodiment, the encoded and modulated drive signals in the drive end 2T may be encoded by using a Hadamard matrix, and the detection end 2R may decode the detection matrix using an inverse Hadamard matrix of the Hadamard matrix. The encoded and modulated drive signals may only be phase modulated or may be phase and amplitude modulated, e.g. implemented by using the quadrature amplitude modulation (QAM).

In one embodiment, the concurrent driving capacitive touch sensing device 2 includes a drive unit 22, an encoding unit 25, a modulation unit 26, the capacitive sensing matrix 200, a detection circuit 23, a decoding unit 27, a processing unit 24 and a buffer 28. In one embodiment, the drive unit 22, the encoding unit 25 and the modulation unit 26 may be combined to form a drive chip to be served as the drive end 2T; and the detection circuit 23, the decoding unit 27, the processing unit 24 and the buffer 28 may be combined to form a sense chip to be served as the detection end 2R.

In another embodiment, the encoding unit 25 and the modulation unit 26 may be combined to form a single encoding and modulation unit; and the decoding unit 27 and the buffer 28 may be integrated with the processing unit 24.

The drive unit 22 is configured to output a drive signal X(t) to the encoding unit 25, e.g. $X(t)=Vd \times exp(jwt)$, wherein Vd indicates a drive voltage value, w indicates a drive frequency and t indicates time. As described in the previous embodiment, the drive signal X(t) is not limited to a continuous signal. In another embodiment, the drive unit 22 may output a plurality of identical drive signals X(t) to the encoding unit 25.

The encoding unit 25 is configured to encode the drive signal X(t) corresponding to each row of the sensing elements so as to output an encoded drive signal Xc(t). In one embodiment, the encoding unit 25 encodes the drive signal X(t) using an encoding matrix, e.g. a Hadamard matrix. It is appreciated that as long as every channel may be distinguished by encoding, other encoding matrices may be used. In addition, the size of the encoding matrix may be determined by the number of channels being driven simultaneously.

The modulation unit 26 is configured to perform the phase modulation on the encoded drive signal Xc(t) corresponding to each row of the sensing elements so as to output encoded and modulated drive signals to each row of the sensing elements (or drive electrodes), and said phase modulation is configured to allow the encoded and modulated drive signals inputted into each row of the sensing elements to have a phase shift from each other. In this manner, it is able to suppress the input voltage of the analog-to-digital converter (ADC) in the detection circuit 23 (as FIGS. 3A and 3B) so as not to exceed a detection range of the ADC converter. In other embodiments, the encoded drive signal Xc(t) may also be amplitude and phase modulated, e.g. using the quadrature amplitude modulation. For example in FIG. 7, the drive end 2T (or modulation unit 26) outputs an encoded and modulated drive signal $X_1(t_k)$ to the first channel, an encoded and modulated drive signal $X_2(t_k)$ to the second channel . . . and an encoded and modulated drive signal $X_n(t_k)$ to the nth channel, wherein k is referred to each drive time slot in a scan period herein.

For example, the encoding matrix may use equation (1) as an example and each matrix element may be indicated by $a_{rs}$, wherein the subscript "r" of each matrix element $a_{rs}$ is associated with each drive time slot and the subscript "s" of each matrix element $a_{rs}$ is associated with each channel.

$$\begin{bmatrix} a_{11} & a_{12} & \cdots & a_{1n} \\ a_{21} & a_{22} & \cdots & a_{2n} \\ & & \ddots & \\ a_{n1} & a_{n2} & \cdots & a_{nn} \end{bmatrix} \quad (1)$$

The operation of the modulation unit 26 may be represented mathematically by a diagonal matrix shown in equation (2), wherein $x_1$ to $x_n$ are complex numbers and preferably have a phase shift from each other. $x_1$ to $x_n$ are configured to perform the phase modulation on different channels respectively. When the quadrature amplitude modulation (QAM) is used as a modulation mechanism, $x_1$ to $x_n$ have an amplitude shift and a phase shift from each other, wherein the subscript of $x_1$ to $x_n$ is associated with each channel.

$$\begin{bmatrix} x_1 & 0 & \cdots & 0 \\ 0 & x_2 & \cdots & 0 \\ & & \ddots & \\ 0 & 0 & \cdots & x_n \end{bmatrix} \quad (2)$$

Referring to FIGS. 7 and 8, based on equations (1) and (2), the drive end 2T (or modulation unit 26) may concurrently output an encoded and modulated drive signal $D_{11}=X(t)a_{11}x_1$ to the first drive electrode, an encoded and modulated drive signal $D_{12}=X(t)a_{12}x_2$ to the second drive electrode . . . and an encoded and modulated drive signal $D_{1n}=X(t)a_{1n}x_n$ to the nth drive electrode in the first time slot $k_1$. The drive end 2T (or modulation unit 26) may concurrently output an encoded and modulated drive signal $D_{21}=X(t)a_{21}x_1$ to the first drive electrode, an encoded and modulated drive signal $D_{22}=X(t)a_{22}x_2$ to the second drive electrode . . . and an encoded and modulated drive signal $D_{2n}=X(t)a_{2n}x_n$ to the nth drive electrode in the second time slot $k_2$. The drive end 2T (or modulation unit 26) may concurrently output an encoded and modulated drive signal $D_{n1}=X(t)a_{n1}x_1$ to the first drive electrode, an encoded and modulated drive signal $D_{n2}=X(t)a_{n2}x_2$ to the second drive electrode . . . and an encoded and modulated drive signal $D_{nn}=X(t)a_{nn}x_n$ to the nth drive electrode in the nth time slot $k_n$. In this embodiment, $D_{11}$ to $D_{1n}$, $D_{21}$ to $D_{2n}$, . . . $D_{n1}$ to $D_{nn}$ are referred to cycle data herein, e.g. sinusoidal data, cosine data or square wave data, but not limited to. The cycle data herein may be continuous wave or discontinuous data set.

As shown in FIG. 9, the drive end 2T is configured to concurrently input a plurality of cycle data (e.g. $D_{11}$ to $D_{1n}$, $D_{21}$ to $D_{2n}$, . . . $D_{n1}$ to $D_{nn}$) of the encoded and modulated drive signals into the drive electrodes in each of a plurality of drive time slots ($K_1$ to $K_n$) of a frame of the capacitive sensing matrix 200. For example in FIG. 9, the drive end 2T inputs $m_1$ cycles of cycle data $D_{11}$ into a first drive electrode within the drive time slot $K_1$; inputs $m_2$ cycles of cycle data $D_{21}$ into the first drive electrode within the drive time slot $K_2$; . . . ; and inputs $m_n$ cycles of cycle data $D_{n1}$ into the first drive electrode within the drive time slot $K_n$; wherein $m_1$ to $m_n$ have a predetermined cycle number, e.g. 32. FIG. 9 also shows a plurality of cycle data (e.g. $D_{12}$ to $D_{n2}$, . . . , $D_{1n}$ to $D_{nn}$) inputted into different drive electrodes within different drive time slots $K_1$ to $K_n$ by the drive end 2T. In this embodiment, the smallest value of the cycle numbers $m_1$ to $m_n$ is equal to the predetermined cycle number. When the drive end 2T resends the encoded and modulated drive signals, the cycle number of the drive time slot containing the resent signals is larger than the predetermined cycle number such that the drive end 2T may drive a part of the drive time slots with different drive time intervals. After the plurality of cycle data $X_1(t_k)$ to $X_n(t_k)$ of the encoded and modulated drive signals of all drive time slots $k_1$ to $k_n$ are inputted into the capacitive sensing matrix 200, an operation of one driving frame is accomplished.

As mentioned above, the capacitive sensing matrix 200 includes a first row of sensing elements $20_{11}$ to $20_{1n}$, a second row of sensing elements $20_{21}$ to $20_{2n}$, . . . and a nth row of sensing elements $20_{n1}$ to $20_{nn}$ (i.e. channels 1 to n). The cycle data of the encoded and modulated drive signals $X(t)a_{11}x_1$, $X(t)a_{12}x_2$, . . . $X(t)a_{1n}x_n$ are concurrently inputted into the first row of sensing elements $20_{11}$ to $20_{1n}$, the second row of sensing elements $20_{21}$ to $20_{2n}$, . . . and the nth row of sensing elements $20_{n1}$ to $20_{nn}$ in the first time slot k, respectively. The cycle data of the encoded and modulated drive signals inputted into each row of the sensing elements in other time slots $k_2$ to $k_n$ are also shown in FIGS. 8 and 9. In addition, lines of the capacitive sensing matrix 200 have different reactance with respect to different channels, and an one-dimensional matrix $[y_1 \, y_2 \, \ldots \, y_n]^T$ may be used to represent the reactance matrix of the capacitive sensing matrix 200 mathematically. In one scan period, if the capacitive sensing matrix 200 is not touched, the reactance matrix is substantially unchanged; whereas when a touch occurs, at least one matrix element of the reactance matrix is changed such that the predetermined number of sampled values corresponding to each cycle data in each of the drive time slots are changed accordingly.

As shown in FIG. 7, each column of the sensing elements of the capacitive sensing matrix 200 is coupled to the detection end 2R (or detection circuit 23) via a respective switch device $SW_1$ to $SW_n$. Within each drive time slot $k_1$ to $k_n$ of one scan period, the switch devices $SW_1$ to $SW_n$ sequentially couple a corresponded column of the sensing elements (or sense electrodes) to the detection end 2R (or detection circuit 23) to allow the detection end 2R (or detection circuit 23) to acquire the predetermined number of sampled values corresponding to each of the cycle data of each of the drive time slots and generate a detection signal y(t) corresponding to each column of the sensing elements according to the processing result of notch filtering or standard deviation of the sampled values of each of the drive time slots. For example FIG. 7 shows a detection signal y(t) associated with each column of the sensing elements generated according to the processing result of notch filtering or standard deviation of the sampled values associated with all cycle data at every sense electrode within a drive time slot. In FIG. 9, for example in the drive time slot $K_1$ the detection end 2R may calculate a detection signal y(t) according to all sampled values corresponding to the m, cycles of cycle data $D_{22}$ at a drive electrode; and a detection signal (y) may similarly obtained respectively in other drive time slots. Before calculating the detection signal y(t), the sampled values corresponding to each of the cycle data of the drive time slots may be temporarily stored in the buffer 28. For example FIG. 7 shows that the switch device $SW_2$ couples the second column of the sensing elements of the capacitive sensing matrix 200 to the detection end 2R (or detection circuit 23). As mentioned above, in the present disclosure the cycle data is resent when the noise interference is serious such that when a magnitude variation of the predetermined number of sampled values corresponding to a cycle data is not within a predetermined detection range, the sampled values are ignored without being used to generate the detection signal y(t). The detection end 2R then generates a detection matrix according to the detection signal y(t) of each of the drive time slots and then decodes the detection matrix so as to generate a two-dimensional detection vector corresponding to every channel.

Therefore, after one scan period (i.e. one frame), the detection signal y(t) from every column of the sensing elements of the capacitive sensing matrix 200 may be represented by X(t)×[encoding matrix]×[modulation matrix]×[reactance matrix] as shown in equation (3) mathematically, wherein matrix elements of the encoding matrix may be determined according to the encoding method being used; matrix elements of the modulation matrix may be determined according to the modulation mechanism being used; and matrix elements of the reactance matrix may be determined according to the capacitive sensing matrix 200. As mentioned above, the detection circuit 23 may include at least one integrator and at least one ADC converter (as shown in FIGS. 3A and 3B) configured to obtain two digital components I and Q of the two-dimensional superposed detection vector (1+jQ) according to the detection signal y(t).

$$y(t) = x(t) \times \begin{bmatrix} a_{11} & a_{12} & \cdots & a_{1n} \\ a_{21} & a_{22} & \cdots & a_{2n} \\ & & \ddots & \\ a_{n1} & a_{n2} & \cdots & a_{nn} \end{bmatrix} \times \begin{bmatrix} x_1 & 0 & \cdots & 0 \\ 0 & x_2 & \cdots & 0 \\ & & \ddots & \\ 0 & 0 & \cdots & x_n \end{bmatrix} \times \begin{bmatrix} y_1 \\ y_2 \\ \vdots \\ y_n \end{bmatrix} \quad (3)$$

Therefore, the two-dimensional superposed detection vectors outputted by the detection circuit 23 after one scan period may be represented by a detection matrix $[(I_1+jQ_1) (I_2+jQ_2) \ldots (I_n+jQ_n)]^T$. In FIG. 7, $(I_{12}+jQ_{12})$ is the two-dimensional superposed detection vector obtained according to the detection signal y(t) of one column (e.g. the second column) of the sensing elements in the first drive time slot $k_1$. As the encoded and modulated drive signals $X_1(t_k)$ to $X_n(t_k)$ are concurrently inputted into every channel in the first drive time slot $k_1$ respectively, the two-dimensional superposed detection vector $(I_{12}+jQ_{12})$ contains the superposition of detection signals of all channels on the second column of the sensing elements in the first drive time slot $k_1$. Similarly, $(I_{22}+jQ_{22})$ is the two-dimensional superposed detection vector obtained according to the detection signal y(t) of one column (e.g. the second column) of the sensing elements in the second drive time slot $k_2$ and contains the superposition of detection signals of all channels on the second column of the sensing elements in the second drive time slot $k_2$; ...; $(I_{n2}+jQ_{n2})$ is the two-dimensional superposed detection vector obtained according to the detection signal y(t) of one column (e.g. the second column) of the sensing elements in the nth drive time slot $k_n$ and contains the superposition of detection signals of all channels on the second column of the sensing elements in the nth drive time slot $k_n$. FIG. 7 also shows the two-dimensional superposed detection vectors, which are stored in the buffer 28, associated with other columns of the sensing elements.

For decoupling the superposition of detection signals of every channel, the detection circuit 23 sends the detection matrix to the decoding unit 27 for decoding. The decoding unit 27 then outputs two-dimensional detection vectors of every channel (i.e. the sensing element) in one column of the sensing elements (e.g. the second column) as shown by equation (4). For example, in the second column the two-dimensional detection vector of channel 1 is represented by $(i_{12}+jq_{12})$, the two-dimensional detection vector of channel 2 is represented by $(i_{22}+jq_{22})$, ... and the two-dimensional detection vector of channel n is represented by $(i_{n2}+jq_{n2})$, wherein i and q are two digital components of the two-dimensional detection vectors. In FIG. 7, after one scan period, the decoding unit 27 may output a set of two-dimensional detection vectors corresponding to every column of the sensing elements; i.e. n sets of $[(i_1+jq_1) (i_2+jq_2) \ldots (i_n+jq_n)]^T$. The decoding unit 27 may use an inverse matrix of the encoding matrix to decouple the superposition of the detection signals (i.e. the detection matrix), e.g. using the inverse matrix of the Hadamard matrix.

$$\begin{bmatrix} i_1 + jq_1 \\ i_2 + jq_2 \\ \vdots \\ i_n + jq_n \end{bmatrix} = \begin{bmatrix} a_{11} & a_{12} & \cdots & a_{1n} \\ a_{21} & a_{22} & \cdots & a_{2n} \\ & & \ddots & \\ a_{n1} & a_{n2} & \cdots & a_{nn} \end{bmatrix}^T \begin{bmatrix} I_1 + JQ_1 \\ I_2 + JQ_2 \\ \vdots \\ I_n + JQ_n \end{bmatrix} \quad (4)$$

Finally, the processing unit 24 may calculate a norm of vector of the two-dimensional detection vector of every channel and compare the obtained norm of vector with a threshold TH as shown in FIG. 4.

In this manner, after one scan period, the processing unit 24 may identify a touch event and/or a touch position on the capacitive sensing matrix 200 according to a comparison result of comparing n×n norm of vectors with the threshold TH, wherein n indicates the size of the sensing matrix.

In addition, when the drive signal X(t) is also amplitude modulated in this embodiment, the processing unit 24 may further include an automatic level control (ALC) to eliminate the amplitude shift. For example, the control parameter of the ALC when the capacitive sensing matrix 200 is not pressed may be previously saved in the processing unit 24 (or an additional memory unit) to, for example, allow the detection results of every sensing element to be substantially identical. Accordingly, when a touch occurs, it is able to identify the touch event accurately.

In addition, as mentioned above, each of the sensing elements ($20_{11}$ to $20_{nn}$) may include a first electrode 101 and a second electrode 102 configured to form a coupling capacitance 103 (as shown in FIGS. 2, 3A and 3B) therebetween. The cycle data of the encoded and modulated drive signals $X_1(t_k)$ to $X_n(t_k)$ are inputted to the first electrode 101. The detection circuit 23 is coupled to the second electrode 102 and configured to detect the detection signal y(t) coupled to the second electrode 102 from the plurality of cycle data $X_1(t_R)$ to $X_n(t_k)$ of the encoded and modulated drive signals through the coupling capacitance 103.

As mentioned above, the information sent by the conventional TDM has a low signal-to-noise ratio. Therefore, the present disclosure further provides a concurrent driving capacitive touch sensing device (FIG. 7) that concurrently inputs drive signals to each channel and reads detection signals from each channel in every transmission time slot. As the duty cycle of every channel in each scan period is increased, the signal-to-noise ratio is effectively increased thereby increasing the identification accuracy. In addition, as the detection end calculates the detection signal only according to valid sampled values and ignores invalid sampled values, the identification accuracy is effectively increased.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A concurrent driving capacitive touch sensing device comprising:

a capacitive sensing matrix comprising a plurality of drive electrodes and a plurality of sense electrodes configured to form coupling capacitance;

a drive end configured to
concurrently input cycle data of encoded and modulated drive signals into the drive electrodes, and
concurrently input a plurality of cycle data into the drive electrodes in each of a plurality of drive time slots of a frame of the capacitive sensing matrix, and the cycle data within a same drive time slot and corresponding to a same drive electrode are identical; and a detection end coupled to one of the sense electrodes and configured to
acquire a predetermined number of sampled values corresponding to the cycle data associated with the coupled sense electrode and generate a response signal to the drive end according to the sampled values, and
be sequentially coupled to the sense electrodes of the capacitive sensing matrix so as to acquire the predetermined number of sampled values corresponding to each of the cycle data of each of the drive time slots, and generate a detection signal according to notch filtering or standard deviation of the sampled values of each of the drive time slots,
wherein the drive end resends the cycle data according to the response signal.

2. The sensing device as claimed in claim 1, wherein when a magnitude variation of the sampled values is not within a predetermined detection range, the detection end generates the response signal to the drive end, and the drive end resends the cycle data when receiving the response signal.

3. The sensing device as claimed in claim 1, wherein when a magnitude variation of the sampled values is within a predetermined detection range, the detection end generates the response signal to the drive end, and the drive end resends the cycle data when not receiving the response signal for a predetermined time interval.

4. The sensing device as claimed in claim 1, wherein the sampled values not within a predetermined detection range is not used to generate the detection signal.

5. The sensing device as claimed in claim 1, wherein the detection end is further configured to
generate a detection matrix according to the detection signal of each of the drive time slots; and
decode the detection matrix so as to generate a two-dimensional detection vector corresponding to each channel.

6. The sensing device as claimed in claim 5, wherein the encoded and modulated drive signals are encoded by a Hadamard matrix and the detection end decodes the detection matrix using an inverse matrix of the Hadamard matrix.

7. The sensing device as claimed in claim 1, wherein the encoded and modulated drive signals are modulated by phase modulation or quadrature amplitude modulation.

8. A concurrent driving capacitive touch sensing device comprising:
a capacitive sensing matrix comprising a plurality of drive electrodes and a plurality of sense electrodes configured to form coupling capacitance;
a drive end configured to concurrently input a plurality of cycle data of encoded and modulated drive signals into the drive electrodes in each of a plurality of drive time slots of a frame of the capacitive sensing matrix; and
a detection end coupled to one of the sense electrodes and configured to
acquire a predetermined number of sampled values corresponding to each of the cycle data of the drive time slots associated with the coupled sense electrode and generate a response signal to the drive end according to the sampled values,
sequentially couple to the sense electrodes of the capacitive sensing matrix so as to acquire the predetermined number of sampled values corresponding to each of the cycle data of each of the drive time slots; and
generate a detection signal according to notch filtering or standard deviation of the sampled values of each of the drive time slots,
wherein the drive end extends the associated drive time slot according to the response signal.

9. The sensing device as claimed in claim 8, wherein when a magnitude variation of sampled values corresponding to a cycle data is not within a predetermined detection range, the detection end generates the response signal to the drive end, and the drive end extends the drive time slot associated with the cycle data when receiving the response signal.

10. The sensing device as claimed in claim 8, wherein when a magnitude variation of sampled values corresponding to a cycle data is within a predetermined detection range, the detection end generates the response signal to the drive end, and the drive end extends the drive time slot associated with the cycle data when not receiving the response signal for a predetermined time interval.

11. The sensing device as claimed in claim 8, wherein the sampled values not within a predetermined detection range is not used to generate the detection signal.

12. The sensing device as claimed in claim 8, wherein the detection end is further configured to
generate a detection matrix according to the detection signal of each of the drive time slots; and
decode the detection matrix so as to generate a two-dimensional detection vector corresponding to each channel.

13. The sensing device as claimed in claim 12, wherein the encoded and modulated drive signals are encoded by a Hadamard matrix and the detection end decodes the detection matrix using an inverse matrix of the Hadamard matrix.

14. The sensing device as claimed in claim 8, wherein the encoded and modulated drive signals are modulated by phase modulation or quadrature amplitude modulation.

15. A concurrent driving capacitive touch sensing device comprising:
a capacitive sensing matrix comprising a plurality of drive electrodes and a plurality of sense electrodes configured to form coupling capacitance;
a drive end configured to concurrently input a plurality of cycle data of encoded and modulated drive signals into the drive electrodes in each of a plurality of drive time slots of a frame of the capacitive sensing matrix, wherein an cycle number of the cycle data of at least a part of the drive time slots is larger than a predetermined cycle number; and
a detection end configured to be sequentially coupled to the sense electrodes of the capacitive sensing matrix and decode a detection matrix obtained by detecting channels of the drive electrodes and the sense electrodes so as to generate a two-dimensional detection vector corresponding to each of the channels.

16. The sensing device as claimed in claim 15, wherein the encoded and modulated drive signals are encoded by a Hadamard matrix and the detection end decodes the detection matrix using an inverse matrix of the Hadamard matrix.

17. The sensing device as claimed in claim 15, wherein the encoded and modulated drive signals are modulated by phase modulation or quadrature amplitude modulation.

18. The sensing device as claimed in claim 15, wherein a slot number of the drive time slots is equal to an electrode number of the drive electrodes concurrently driven by the drive end.

\* \* \* \* \*